Figure 1:
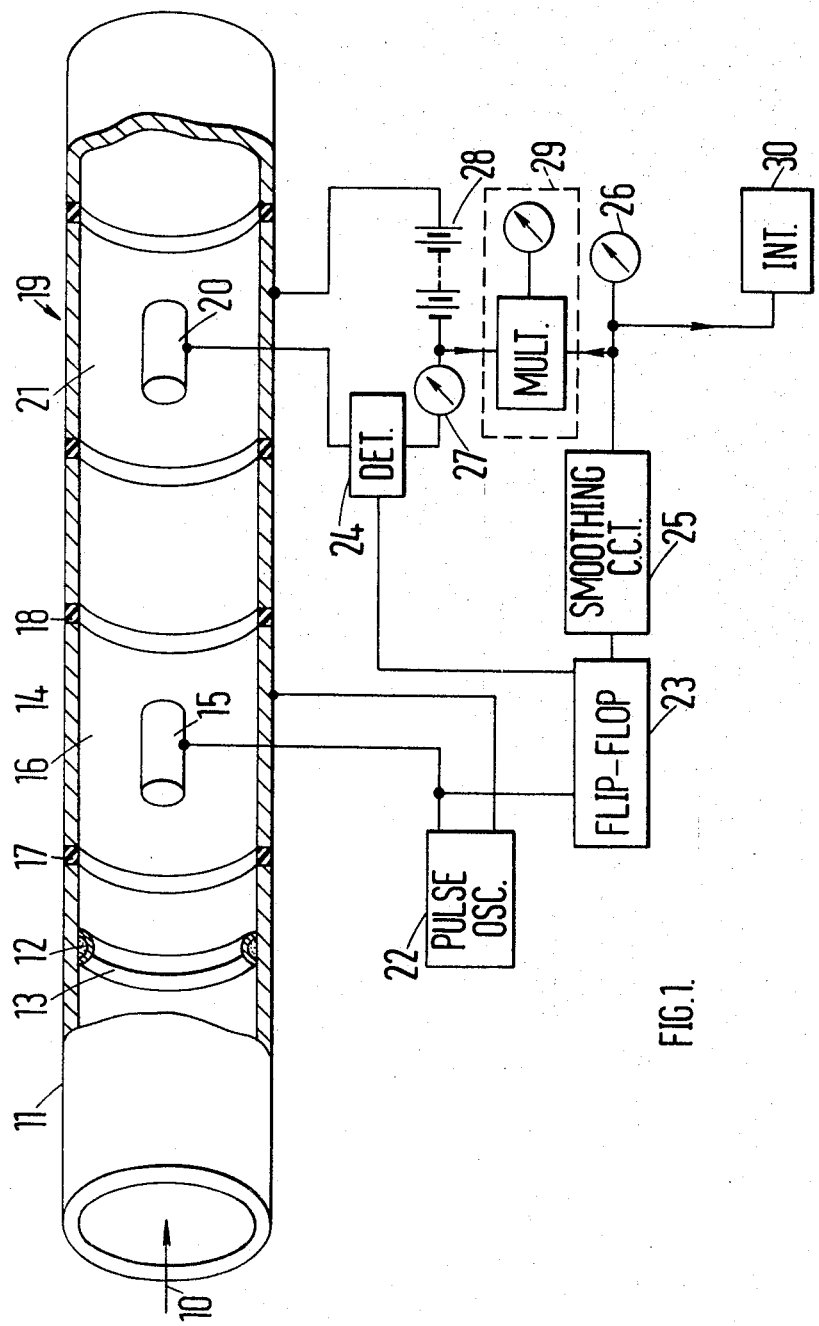

United States Patent [19]
Brain

[11] 3,842,670
[45] *Oct. 22, 1974

[54] IMPROVEMENTS IN MEASURING THE VELOCITY OF GASES

[75] Inventor: Thomas John Stirrat Brain, Hamilton, Scotland

[73] Assignee: National Research Development Corporation, London, England

[*] Notice: The portion of the term of this patent subsequent to Aug. 29, 1989, has been disclaimed.

[22] Filed: Aug. 28, 1972

[21] Appl. No.: 284,065

Related U.S. Application Data
[63] Continuation-in-part of Ser. No. 21,940, March 23, 1970, Pat. No. 3,688,106.

[30] Foreign Application Priority Data
Sept. 16, 1971 Great Britain................... 43220/71
Mar. 28, 1969 Great Britain................... 16537/69

[52] U.S. Cl............................. 73/194 F, 250/356
[51] Int. Cl............................................. G01f 1/00
[58] Field of Search............... 73/194 E, 194 F, 181; 250/43.5 FC, 356

[56] References Cited
UNITED STATES PATENTS

| | | |
|---|---|---|
| 2,632,326 | 3/1953 | Stuart .................................. 73/181 |
| 2,637,208 | 5/1953 | Mellen ............................... 73/194 F |
| 3,399,566 | 9/1968 | Brown ............................ 73/194 E X |
| 3,688,106 | 8/1972 | Brain............................. 73/194 F X |

Primary Examiner—Charles A. Ruehl
Attorney, Agent, or Firm—Cushman, Darby & Cushman

[57] ABSTRACT

A meter and a method of measuring the velocity of gas in a duct are described, and the volumetric flow rate may be also determined as well as the total volume of gas passed through the meter in a given time. In one form the meter has an ion source and two ion collectors, so that gas in the duct is first ionized and then passes the collectors. The source and the collectors are devised to present little or no impedance to gas flow. A voltage pulse is applied to the first collector and when the resulting change in the number of ions collected at the second collector is detected another pulse is applied to the first collector. The frequency of the pulses applied to the first collector is measured to give gas velocity. Measurement of the total volume of gas flow through the meter is by counting the said pulses. A specially shaped duct is also described to increase absolute accuracy with which volumetric flow rate and the total volume of gas passed through the meter can be determined without flow calibration.

17 Claims, 4 Drawing Figures

IMPROVEMENTS IN MEASURING THE VELOCITY OF GASES

This is a Continuation-In-Part of copending application, Ser. No. 21,940, now U.S. Pat. No. 3,688,106, which is assigned to the common asignee herewith. The present invention relates to methods and apparatus for measuring the velocity of gases in a duct. In addition the volumetric flow rate and the total volume of gas passed through the meter in a given time may also be measured.

A known gas velocity meter employs an ionizing source between two spaced ion collectors. The ratio of the ions collected by the collectors is then an indication of the velocity of the gas. However this known meter is affected by variations in the ion recombination constant and is only suitable for the measurement of high gas velocities.

According to a firt aspect of the present invention there is provided a meter for measuring the velocity of gases, including ionizing means for ionizing at least part of a gas flowing along a duct, first and second electrode means, for collecting ions, spaced apart in the duct, control means for effecting, on receipt of a control signal, a change in the number of ions collected by the first electrode means, means for detecting resultant changes in the number of ions collected by the second electrode means and for passing a control signal to the control means every time such changes are detected, and means for providing a signal indicative of the frequency of the control signals.

By taking account of the volume of gas contained between the electrode means the frequency may also be used to give a measure of volumetric flow rate.

By the addition of means for determining the number of control signals passed to the control means, the meter mey be used to measure the total volume of gas passed through the meter in a given time.

According to a second aspect of the present invention there is provided a method for measuring the velocity of gases including ionizing at least a part of the gases flowing along a duct, effecting a change in the number of ions collected at a first point in the duct, detecting resultant changes in the number of ions collected at a second point in the duct, effecting further changes in the number of ions collected at first point every time resultant changes are detected at the second point, and measuring the frequency at which changes are effected at the first point, or measuring a quantity dependent on the said frequency.

According to a third aspect of the present invention there is provided a meter for measuring the velocity of gases, including ionizing means for ionizing at least a part of a gas flowing along a duct without changing the velocity of the gas, first and second electrode means, for collecting ions, spaced apart in the duct, means for effecting a change in the number of ions collected by the first electrode means, and means for providing a signal dependent on the interval between the time at which a change in the number of ions collected by the first electrode means is effected and the time at which a resultant change occurs in the number of ions collected at the second means, the meter being such that the velocity of gas flowing in the duct depends on the said interval.

A gas meter prover may be provided by modifying the meter according to the third aspect of the invention by calibrating the volume of the duct between the first and second electrode means, and by the addition of means for integrating that signal which is dependent on the said interval.

In meters according to the first and third aspects of the invention for measuring gas volumetric flow rate and total volume of gas passed, first and second portions of the duct may be constricted in cross sectional area to ensure that gas in the constrictions has an approximately constant velocity across the duct cross section transverse to the duct axis. The first and second electrode means are then positioned in the constrictions of the first and second portions, respectively.

The meters and method according to the invention do not suffer from the above mentioned disadvantages of the known ion meter since transit time is not affected by the ion recombination constant and relatively low as well as high gas velocities can be measured.

In the meters according to the first and third aspects of the invention the ionizing means preferably includes the isotope Americium-241 (alpha emitting) of the isotope mixture Strontium-90/Yttrium-90 (beta emitting).

These isotopes may be placed in a sealed thin metal foil located around the inner surface of the duct.

The first and second electrode means may each comprise two electrodes. The means for effecting a change in the number of ions collected by the first electrode means may be a pulse source adapted to apply a square-wave voltage between the electrodes of the first electrode means.

The meter for measuring gas velocity has many desirable features: since it prevents little or no obstruction to gas flow, there will be only a negligible head loss across it. The meter is easy to install and no sealing problems are encountered. Since there are no moving parts the meter will not wear out, and there is no need to convert a mechanical signal to an electrical signal. Calibration of the meter is linear.

Certain embodiments of the invention will now be described, by way of example, with reference to the accompanying drawings, in which:-

Figure 2:
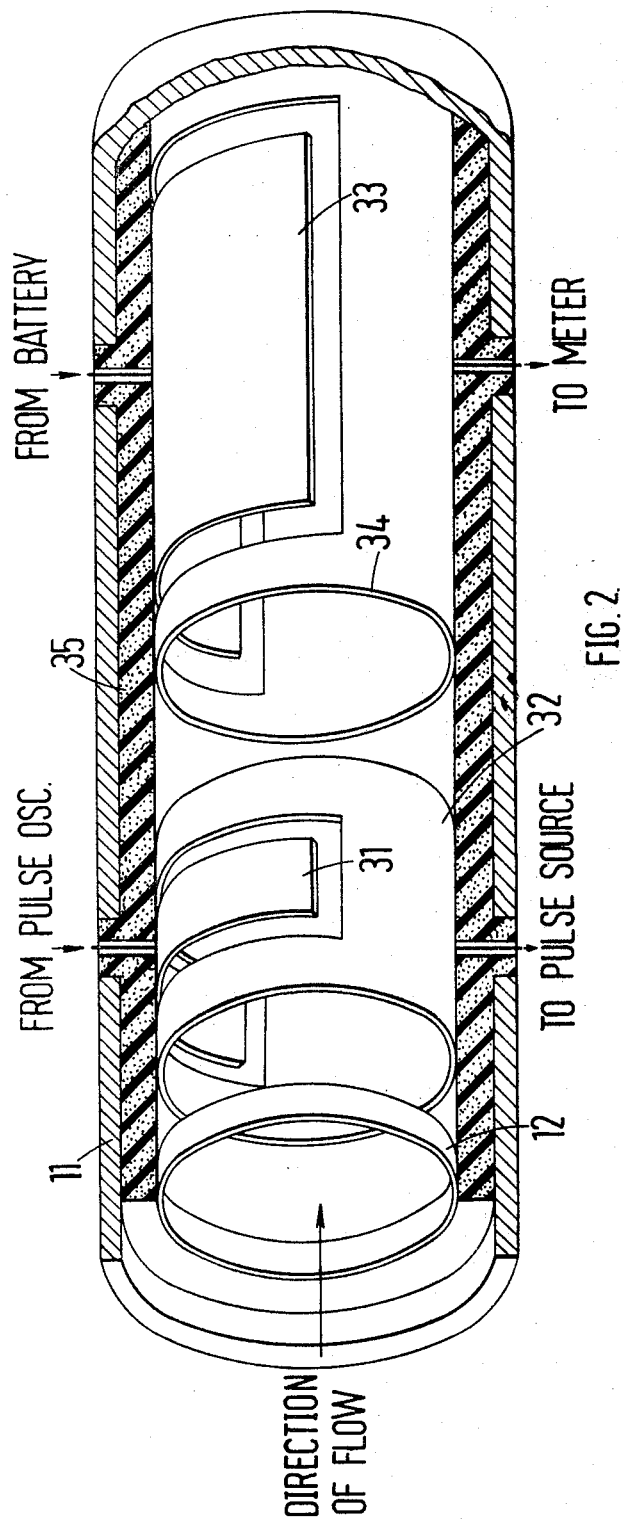
Figure 3:
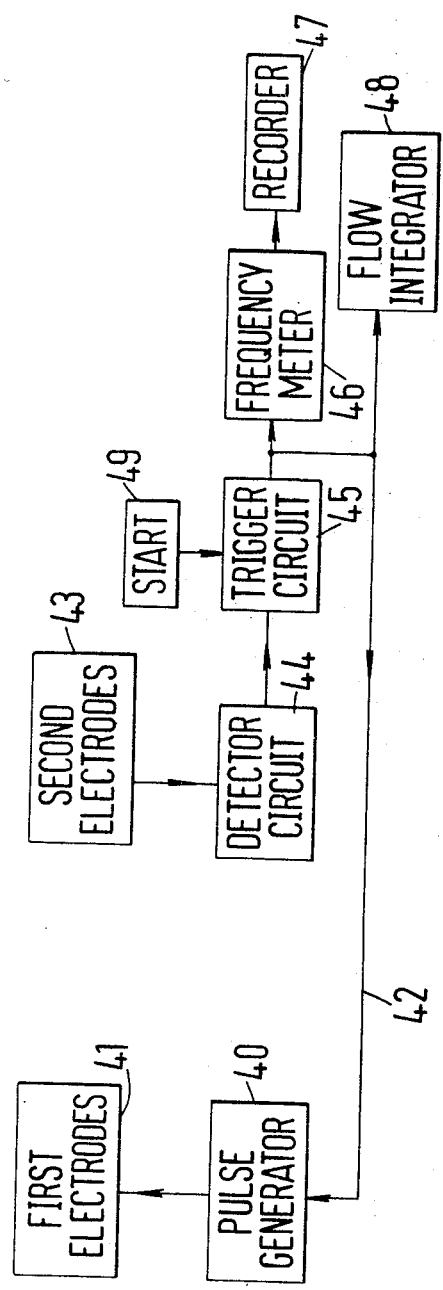
Figure 4:
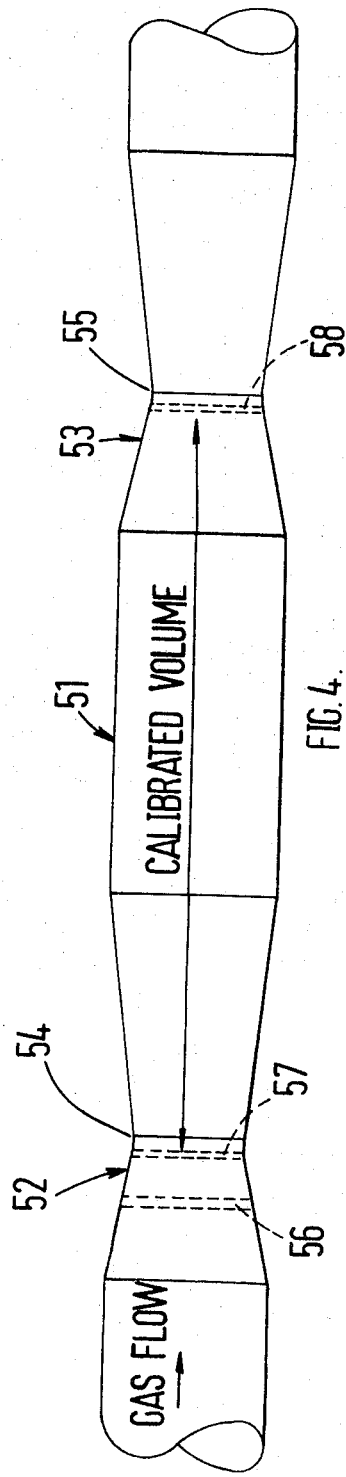

FIG. 1 is a part-schematic part-block diagram of one embodiment of a meter for measuring gas velocity and mass flow, FIG. 2 is a schematic drawing of an electrode arrangement which may be used instead of the arrangement shown in FIG. 1, FIG. 3 is a block diagram of the electrical circuit of a gas velocity meter according to the first aspect of the present invention, and FIG. 4 shows a modified duct shape for use in a meter prover according to the third aspect of the present invention.

In FIG. 1 gas passes in the direction of an arrow 10 along a pipe 11. The gas is first ionized by radioactive powder 12 sealed within a thin metal foil 13 located around the inner circumference of the pipe. As has been mentioned, the powder may contain the radioactive Americium-241 (alpha emitting) or the isotope mixture Strontium190/ Yttruim-90 (beta emitting).

After being ionized the gas passes to an ion collection section 14 of the pipe 11 comprising two electrodes; firstly a cylindrical rod electrode 15 located at the centre of the pipe co-axial therewith, and secondly an electrode 16 which is a section of the pipe wall insulated from the remainder of the pipe by insulating sections 17 and 18.

Gas then passes to a second ion-collection section 19 of the same form as the first such section. This second section has a cylindrical centre electrode 20 and a wall-section electrode 21 insulated from the remainder of the pipe.

The electrodes 15 and 20 are supported by brass rods (not shown) within, and radial to, the pipe 11. The rods are fixed to, but insulated from, the electrodes 16 and 21, and provide a means for making connections to the electrodes 15 and 20.

A square-wave voltage from a pulse oscillator 22 having a repetition frequency of approximately 100 c/s is applied between the electrodes 15 and 16. The effect is that for the duration of each voltage pulse a number of ions are collected in the section 14, and in the intervals between pulses when zero voltage is applied between the electrodes 15 and 16, no ions are collected in this section. The interval between the leading edge of pulses from the oscillator 22 and the corresponding fall in the number of ions collected at the electrode 20 depends on the velocity of the gas in the pipe. Each time the leading edge of a pulse from the oscillator occurs, a flip-flop circuit 23 is set to a particular one of its two states, the flip-flop circuit being reset by a signal from a detector circuit 24 when a decrease in the number of ions collected at the electrode 20 is detected. Thus the interval for which the flip-flop circuit 23 is in its said one state depends on the velocity of the gas. The pulse output from the flip-flop circuit 23 is passed to a smoothing circuit 25 whose output is connected to a d.c. volt meter 26 which indicates the velocity of gas flow directly.

The electrode 20 is connected in series with a direct current meter 27 and a battery 28 which applies a unidirectional voltage of about 120 volts between the electrodes 20 and 21.

The detector 24 may include a resistor (not shown) in a series with the battery 28, and a trigger circuit (not shown) responsive to changes in voltage across the resistor. Hence when the current in the resistor due to the collection of ions changes, the trigger circuit changes the state of the flip-flop circuit 23.

The number of ions arriving at the electrode 20 is found measuring the battery current and is dependent on the total strength of the source and the ionization cross-section of the gas which are fixed for a given meter and gas. The number is also generally dependent on the gas velocity and density at the ionizing section but for a particular source strength, over a given velocity range, the ion collection current, as indicated by the meter 27, is independent of velocity and for a gas of constant composition it may be shown that in the intervals when no ions are collected at section 14 and all the ions arriving at section 19 are collected, the ion collection current, $$I = A\ Jfp/p_a e$$

where $A$ = cross-sectional area of the pipe
$J$ = ionizing power of the source
$f$ = the ionization cross-section of the gas
$p$ = the density of the gas at ionizing point
$P_a$ = the density of the gas at S.T.P.
$I$ = the collector current
$e$ = the charge on an electron therefore $I = Kp$ where $K$ is a constant. The ionizing power, $J$, is a factor depending on the source strength. The ionization cross-section of the gas, $f$, gives a measure of the ability of the gas to be ionized. The product $Jf$ is the number of ion pairs per unit volume of gas produced when the gas is moving at unit velocity at S.T.P. conditions. Thus ionization current as indicated by the meter 27 gives a measure of the gas density $(P)$ in the pipe adjacent to the ionizing source.

For accurate measurement of gas density, the composition of the gas should be constant, dust content should be low, and temperature variations between the sections 14 and 19 should be small.

The accuracy of density measurement required, determines the velocity range in which density measurement can be carried out. For example the error in density measurement will be $\leq 0.01$ per cent if $$\lambda Jf\sigma L \leq 10^{-4}\mu^2$$

where $\sigma = p/p_a$
$\lambda$ = the ion recombination coefficient,
$\mu$ the velocity of the gas at the ionizing section, and $L$ = the distance between the ionizing source and the second ion-collection section.

The voltage from the smoothing circuit 25 and the current in the meter 27 are applied to a circuit 29 which multiplies the average value of the current by the value of the voltage to give a product which is proportional to the mass flow of gas in the pipe. The circuit 29 may be a Watt meter. The current flowing in the meter 27 will be a pulse current, but provided the response time of this meter and that of the circuit 29 is low compared with the frequency of the pulse oscillator 22, steady accurate output readings will be obtained.

The electrodes of FIG. 1 may be replaced by the electrode arrangement of FIG. 2 which has the advantage that there is no obstruction to gas flow.

The electrodes 15 and 16 are replaced by sheet metal electrodes 31 and 32 respectively. Similar but rather larger sheet metal electrodes 33 and 34 replace the electrodes 20 and 21. The radioactive source 12 is constructed as in FIG. 1, and the electrodes and the source are contained in an insulating tube 35 which lines the pipe 11. The electrodes 31 and 32 are connected to the "live" and the earth side of the pulse oscillator 22, respectively, the electrode 33 is connected to the high voltage terminal of the battery 28, and the electrode 34 is connected to the direct current meter 27.

Another circuit for measuring gas velocity and also for measuring the total volume of gas passed through the meter in a given time will now be described with reference to FIG. 3. A duct (not shown in FIG. 3) contains a radioactive source which may be as described above and two pairs 41 and 43 of electrodes downstream from the source. Suitable arrangements of duct, source, electrodes and biasing have already been described in connection with FIGS. 1 and 2 but other arrangements are suitable. For example where each electrode pair includes an inner electrode in the duct and an outer electrode which is the duct wall, the inner electrode in either or both pairs may, instead of being a rod, or tube, which is mounted near the inner surface of the duct, be in the form of a tube of fairly narrow diameter compared with the duct, or may be made up of a number of radial vanes mounted to a circular outer member adjacent to the inner surface of the duct. In another electrode arrangement each pair of electrodes comprises several concentric open-ended metal cylinders coaxial with the duct. Alternate cylinders in the pair 41 are connected to one terminal of the pulse generator 40 and the other cylinders are connected to the other generator terminal. Similarly alternate cylinders in the pair 43 are connected to one terminal of the detector circuit 44 while the other cylinders are connected to the other detector circuit terminal.

These other electrode arrangements may also be used in the arrangement of FIG. 1 instead of the electrodes shown. In FIG. 3 a pulse generator 40 provides voltage pulses which can be either positive or negative between the electrodes of the first pair 41, for example electrodes 15 and 16 of FIG. 1. The pulses occur whenever control signals are applied to the generator 40 along a connection 42. The duration of each pulse must be less than the transit time of ions between the electrode pairs, and preferably less than half the transit time.

Changing the voltage of the inner electrode of the first pair with respect to the outer electrode by applying a pulse causes a change in the number of ions collected by the first pair.

After a delay dependent on the velocity of the gas a resultant change occurs in the number of ions collected by the second pair of electrodes 43. Changes in numbers of ions collected are detected by a circuit 44 and if a change is of sufficient magnitude, a trigger circuit 45 is operated to provide a control pulse in the connection 42. Such a pulse causes the generator 40 to apply a voltage pulse to the electrodes 41, with the result that voltage pulses and control pulses are generated at a rate dependent on the velocity of gas in the duct.

The frequency of the control pulses is measured by a frequency meter 46 whose output is recorded by a recorder 47. In order to obtain an indication of the total volume of gas which has flowed through the meter in a given time, the number of control pulses is summed or counted in an integration circuit 48 which can be set to start integrating at the beginning of measurement and stopped when a given time has elapsed.

A start circuit 49 is provided to initiate the first control pulse for the generator 40 when measurement is to commence. A manual switch in the circuit 49 is arranged to apply a voltage sufficient to trigger the circuit 45.

Gas flowing along a duct has a velocity profile in which as the duct walls are approached the velocity falls. This means that as ions produced by the radioactive source move along the duct, those near the duct walls fall progressively behind those near the centre. The performance of the meter will therefore depend on the positions of the collecting electrodes and the shape of the velocity profile within the duct, so that to obtain good accuracy, flow calibration of the device will be necessary. To produce a device where the ratio of the measured volume between electrodes divided by the pulse transit time will give a closer measure of the volume passed in a given time, without flow calibration, a duct such as that shown in FIG. 4 which tapers to constrictions 52 and 53 in two portions 54 and 55 can be used. As a result of the tapering the velocity profile of gas in the duct is made almost flat over the cross sections at the constrictions where the electrodes are placed since gas near the duct walls is accelerated by the tapers. In FIG. 4 the tapers are conical but other shapes such as part spherical or part elliptical may be used.

The radioactive source, and the electrodes pairs are shown schematically at 56, 57 and 58, respectively. Because of the flat velocity profile pulses with sharply defined leading edges will be obtained at the second electrode arrangement and by choosing a suitable coaxial length between electrodes the volume of gas contained in each electrode section may be made negligibly small compared to the total calibrated volume.

The volume of the duct between the electrode pair 57 and the electrode pair 58 is carefully calibrated, so that when using the circuit of FIG. 3, the generation of a control pulse on detection of a change in the number of ions passing the second electrodes indicates that one calibrated volume of gas has passed through the duct. The total number of such volumes is indicated by the flow integrator 48 which counts or sums the pulses from the trigger circuit 45.

The ducting arrangement shown in FIG. 4 can also be used with the electrical circuits of FIG. 1.

In FIG. 1 the input signal to the meter 26 is proportional to gas velocity and by adding an integrator 30 an output is obtained which gives the volume of gas passed through the meter in a given time.

Volumetric flow rate may be measured using any of the above gas velocity meters, either by calibrating the velocity measurement against a known gas flow, or by multiplying, preferably by using an appropriate meter scale, the known volume of the duct between the electrodes by the gas velocity. Where the duct is of uniform cross section between the electrodes the velocity may simply be multiplied by the cross sectional area of the duct.

The configuration of the ion source and the electrodes need not be as described, and other circuits from that indicated by the block diagrams may be used to evaluate density, velocity, volumetric flow rate, mass flow, and the total volume of gas passed through the meter in a given time.

What is claimed is:

1. A meter for making measurements related to gas flow, including ionizing means for ionizing at least part of a gas flowing along a duct, first and second electrode means for collecting ions spaced apart in the duct, a pulse generator adapted to apply, on receipt of a trigger signal, a pulse to the first electrode means to change the number of ions collected by the first electrode means, means for detecting resultant changes in the number of ions collected by the second electrode means and for passing a trigger signal to the pulse generator every time such changes are detected, and output means for providing an output signal related to the occurrence of the trigger signals.

2. A meter according to claim 1 wherein the means for ionizing gas includes a radioactive source.

3. A meter according to claim 2 wherein the radioactive source includes the isotope Americium-241 or the isotope mixture Strontium-90/Yttrium-90.

4. A meter according to claim 1 wherein the means for detecting changes in the number of ions collected by the second electrode means includes a detector circuit having a voltage output dependent on the number of ions collected and a trigger circuit responsive to changes in the voltage output of the detector circuit exceeding predetermined limits to provide a trigger signal.

5. A meter according to claim 1 wherein the first and second electrode means each include a group of at least two electrodes.

6. A meter according to claim 1 for measuring the velocity of gases wherein the output means provides an output signal which is indicative of the repetition frequency of the trigger signals.

7. A meter according to claim 1 for measuring the volume of gas passing along a duct wherein the output means provides an output signal which is indicative of the number of trigger signals occurring while the said volume of gas passes along the duct.

8. A meter according to claim 7 wherein there is a measured volume of duct between the first and second electrode means, and the meter includes first and second means for modifying the gas flow to provide substantially the same gas velocity over the cross section of the duct at the first and second electrode means, respectively.

9. A meter according to claim 8 wherein the first and second means for modifying gas flow include first and second portions of the duct in each of which the cross-sectional area of the duct becomes progressively smaller in the direction of gas flow until a constriction is reached and then becomes larger again, the first and second electrode means being positioned adjacent to the constrictions in the first and second duct portions, respectively.

10. A meter according to claim 8 wherein the means for ionizing gas includes a radioactive source.

11. A meter according to claim 10 wherein the pulse generator is adapted to supply pulses which are rectangular in wave form to the first electrode means.

12. A meter for making measurements related to gas flow including ionizing means for ionizing at least a part of a gas flowing along a duct in the region of the duct where the velocity of the gas is substantially constant, first and second electrode means for collecting ions spaced apart in the duct, control means for effecting a change in the number of ions collected by the first electrode means, and means for providing a signal dependent on the interval between the time at which a change in the number of ions collected by the first electrode means is effected and the time at which a resulting change occurs in the number of ions collected at the second electrode means.

13. A meter according to claim 12 for measuring the volume of gas passing along the duct, wherein the volume of the duct between the first and second electrode means is known, and means are provided for integrating the signal dependent on the said interval to provide a signal indicative of the volume of gas flowing.

14. A meter according to claim 13 including first and second means for modifying the gas flow to provide a substantially uniform gas velocity over the whole cross section of the duct at both the first and second electrode means, respectively.

15. A meter according to claim 14 wherein the first and second means for modifying gas flow include first and second portions of the duct in each of which the cross-sectional area of the duct becomes progressively smaller in the direction of gas flow until a constriction is reached and then becomes larger again, the first and second electrode means being positioned adjacent to the constrictions in the first and second duct portions, respectively.

16. A meter according to claim 14 wherein the control means includes a pulse generator adapted to supply pulses which are rectangular in wave form to the first electrode means.

17. A meter for measuring the velocity of gases or the volumetric flow rate of gases, including ionizing means for ionizing at least part of a gas flowing along a duct, first and second electrode means for collecting ions spaced apart in the duct, a pulse generator adapted to apply rectangular pulses to the first electrode means on receipt of a control signal to change the number of ions collected by the first electrode means, means for detecting resultant changes in the number of ions collected by the second electrode means and for passing a control signal to the pulse generator every time such changes are detected, and means for providing a signal indicative of the frequency of the control signals.

* * * * *